(12) United States Patent
Haskey et al.

(10) Patent No.: US 9,141,699 B2
(45) Date of Patent: Sep. 22, 2015

(54) DETERMINING DATA FEED USAGE

(75) Inventors: Stephen J. Haskey, Hampshire (GB);
Brian D. Peacock, Hants (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1877 days.

(21) Appl. No.: 12/333,228

(22) Filed: Dec. 11, 2008

(65) Prior Publication Data
US 2009/0182704 A1 Jul. 16, 2009

(30) Foreign Application Priority Data
Jan. 16, 2008 (EP) .................................... 08150300

(51) Int. Cl.
| | | |
|---|---|---|
| G06F 7/00 | (2006.01) |
| G06F 17/30 | (2006.01) |
| H04N 7/173 | (2011.01) |
| H04N 21/258 | (2011.01) |
| H04N 21/442 | (2011.01) |
| H04N 21/458 | (2011.01) |
| H04N 21/4782 | (2011.01) |
| H04N 21/488 | (2011.01) |
| H04N 21/6377 | (2011.01) |
| H04N 21/658 | (2011.01) |
| H04N 21/81 | (2011.01) |

(52) U.S. Cl.
CPC ...... *G06F 17/30864* (2013.01); *H04N 7/17318* (2013.01); *H04N 21/25866* (2013.01); *H04N 21/44204* (2013.01); *H04N 21/44222* (2013.01); *H04N 21/4586* (2013.01); *H04N 21/4782* (2013.01); *H04N 21/488* (2013.01); *H04N 21/6377* (2013.01); *H04N 21/658* (2013.01); *H04N 21/6581* (2013.01); *H04N 21/6582* (2013.01); *H04N 21/8126* (2013.01)

(58) Field of Classification Search
CPC .......... G06Q 10/103; H04N 21/44008; H04N 21/47214; H04N 21/47217; H04N 21/4755; H04N 21/4882; H04N 21/8456; H04N 5/44513; H04N 5/44543
USPC .......................... 707/609, 687, 790, 758–781
See application file for complete search history.

(56) References Cited

U.S. PATENT DOCUMENTS

| | | | |
|---|---|---|---|
| 7,620,697 B1 * | 11/2009 | Davies | 709/217 |
| 2006/0031404 A1 * | 2/2006 | Kassab | 709/218 |
| 2007/0050175 A1 * | 3/2007 | Schmelzer et al. | 702/186 |
| 2007/0094391 A1 | 4/2007 | Nussey | |
| 2007/0226312 A1 * | 9/2007 | Stirbu et al. | 709/217 |
| 2007/0244868 A1 * | 10/2007 | Grubb et al. | 707/3 |
| 2008/0082941 A1 * | 4/2008 | Goldberg et al. | 715/810 |
| 2009/0282144 A1 * | 11/2009 | Sherrets et al. | 709/224 |
| 2011/0078185 A1 * | 3/2011 | Vaughan et al. | 707/770 |

* cited by examiner

*Primary Examiner* — Taelor Kim
(74) *Attorney, Agent, or Firm* — Steven L. Nichols; Van Cott, Bagley, Cornwall & McCarthy P.C.

(57) ABSTRACT

A data feed server configured for tracking usage of a data feed includes a data feed server configured to respond to polls from client computers and transmit a data feed in response to a poll from a client computer. The data feed server is further configured to received usage data from a client computer that indicates usage of the data feed at the client computer. A client computer for accessing a data feed includes a client computer configured to communicate with at least one data feed server that publishes a data feed. The client computer selectively polls the data feed server for the data feed. The client computer is further configured to record usage data indicating usage of the data feed at the client computer and, in a subsequent polling of the data feed sever, report the usage data for the data feed to the data feed server. A method of determining usage of a data feed includes collecting information with a data server that indicates whether a data feed provided by the data server was accessed by a user at a client computer to which the data server had transmitted the data feed.

18 Claims, 4 Drawing Sheets

DETERMINING DATA FEED USAGE

BACKGROUND OF THE INVENTION

The present invention relates to a method, apparatus and software for collecting usage data for one or more data feeds. Specifically, the present invention relates a computer system comprising a set of client computers connected via a network to a server computer wherein the server computer and the client computers may be arranged in conjunction with software for providing data feeds from the server computer to any of the client computers over the network and wherein the usage data for one or more data feeds may be determined and logged.

Data feeds are a mechanism that enables data users or subscribers to receive periodically updated data from a data source or publisher. Data feeds enable a data publisher to disseminate regularly updated data to a large number of data subscribers in an efficient manner. The data may, for example, comprise news, message or financial data and be provided over a network such as the Internet. Data feed protocols commonly operate by the data subscriber or client periodically polling the data feed source for updates to a given data feed. A number of protocols exist for data feed services such as the Really Simple Syndication (RSS) protocol, the Atom Syndication Format (ATF) protocol, or the Resource Description Framework (RDF) Feeds protocol. Data feeds may also be implemented in other network protocols such as the Hypertext Transfer Protocol (HTTP).

Current data feed mechanisms enable subscribers to subscribe to a given feed anonymously. Furthermore, the same data feed subscriber may repeatedly poll the same data feed source regardless of whether or not the user has not viewed the data feed. Thus, it is difficult for a data feed publisher to determine usage statistics for a given data feed.

BRIEF SUMMARY OF THE INVENTION

A data feed server configured for tracking usage of a data feed includes a data feed server configured to respond to polls from client computers and transmit a data feed in response to a poll from a client computer. The data feed server is further configured to received usage data from a client computer that indicates usage of the data feed at the client computer.

A client computer for accessing a data feed includes a client computer configured to communicate with at least one data feed server that publishes a data feed. The client computer selectively polls the data feed server for the data feed. The client computer is further configured to record usage data indicating usage of the data feed at the client computer and, in a subsequent polling of the data feed sever, report the usage data for the data feed to the data feed server.

A method of determining usage of a data feed includes collecting information with a data server that indicates whether a data feed provided by the data server was accessed by a user at a client computer to which the data server had transmitted the data feed.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION OF THE INVENTION

Figure 1:
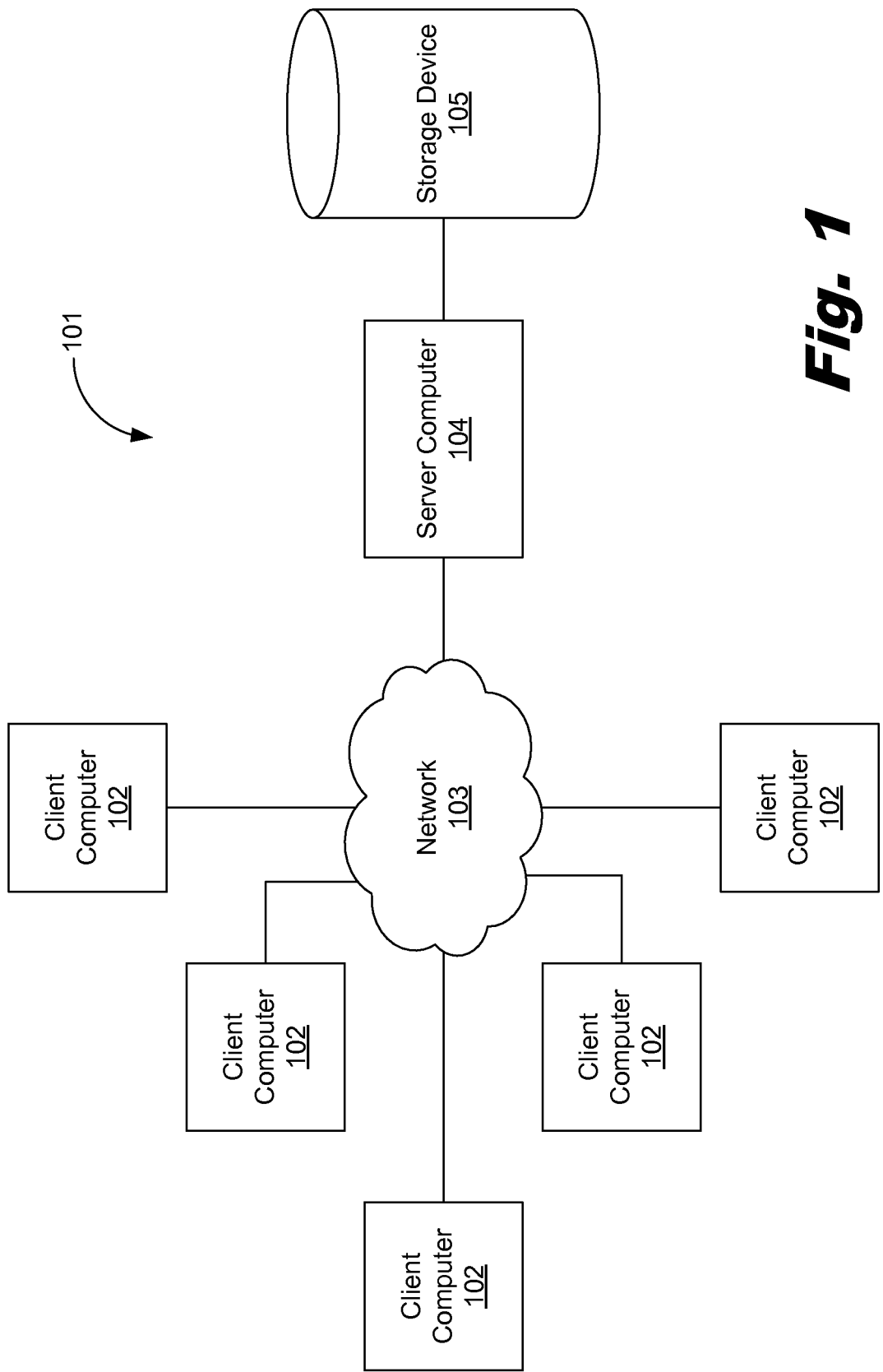
FIG. 1 is a schematic illustration of a computer network in which data feeds are provided by a data feed server computer to data feed client computers according to an embodiment of the present exemplary system and method.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, the Internet, wireline, optical fiber cable, RF, etc.

Computer program code for carrying out operations of the present invention may be written in an object oriented programming language such as Java, Smalltalk, C++, or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, a computer system (101) comprises a set of client computers (102) connected to, for example, a wide area network (WAN) (103), in the form of the Internet, to a server computer (104). The server computer (104) is also connected to a storage device (105). The server computer (104) and the client computers (102) are arranged with software for providing data feeds from the server computer (104) to any of the client computers (102) over the network (103).

Figure 2:
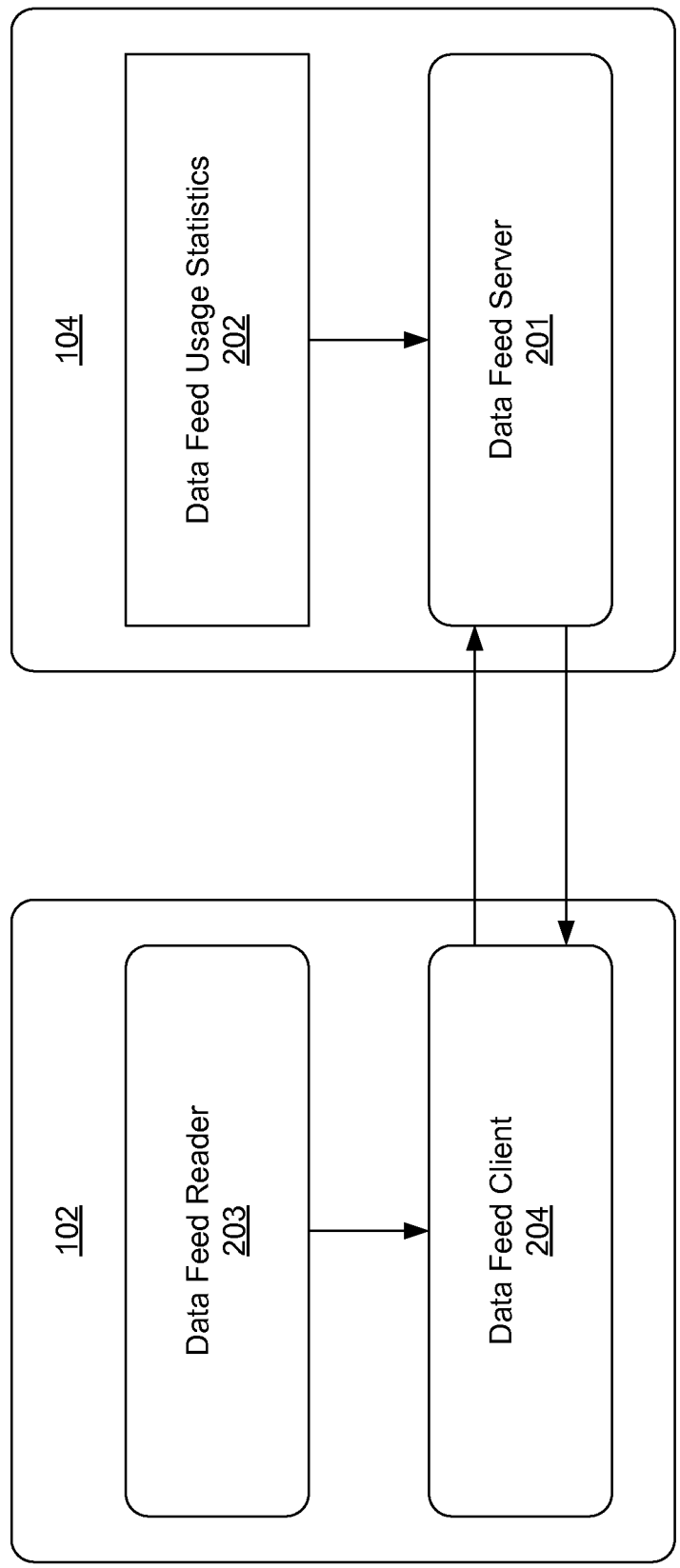
FIG. 2 is a schematic illustration of data feed client and server software systems in the computer system of FIG. 1 according to an embodiment of the present exemplary system and method.

FIG. 2 shows the software provided on the computers (102, 104) in further detail. The server computer (104) comprises a data feed server application program (201) which enables a data feed provider to create or collect data feed content and to publish the content as a data feed file. In the present embodiment, the data feed file format and protocol is the Really Simple Syndication (RSS) protocol and the RSS file format is Extensible Mark-up Language (XML). In the present embodiment, the RSS XML file for a given data feed is published by posting the Universal Resource Locator (URL) of the respective RSS XML file on a website. When the data feed provider or publisher needs to update a data feed, the updates are made to the corresponding RSS XML file. The data feeds may generally comprise three parts: a title, a summary, and a message body. The title and the summary are entered directly in the RSS XML file, along with an entry date. The message body is a Hypertext Mark-up Language (HTML) file that is referenced in the RSS XML file. In the present embodiment, the data feed server is further arranged to collect usage data (202) for the data feeds that it provides to the client computers (102). In the present embodiment, the usage data (202) comprises an indication of the number of instances of a supplied data feed that have been viewed by their respective users. The mechanism by which the usage data (202) is collected is described in further detail below.

The client computer (102) comprises a data feed reader application program (203) in communication with a data feed client application program (204). The data feed reader (203) enables a user to select or subscribe to one or more data feeds, for example, by selecting links from browsed web pages. The data feed are then displayed to the user via a display window of the data feed reader (203). The data feed subscription process is performed with the data feed client (204). Once a data feed has been subscribed to, the data feed client (204) is arranged to periodically check or poll the URL corresponding to the given data feed. Data feed polls are made via HTTP requests to the data feed server (201) using a given data feed URL. Updated data is uploaded to the data feed reader (203) for display to the user. Once uploaded, the data feed reader (203) enables the user to select and view the data provided by a given data feed.

Thus, once the data feed client (204) has been subscribed to a given data feed, it is arranged to poll the data feed server (201) periodically for updates to the content of the given data feed. In the present embodiment, when a data feed has been viewed by the user, the data feed reader (203) is arranged to provide a corresponding indication to the data feed client (204). The data feed reader (203) is arranged to treat a given data feed as "viewed" once it has been selected for viewing by the user. In response to such an indication for a given data feed, the data feed client (204) is arranged to add a flag to the subsequent poll of the corresponding data feed URL. For example, the data feed client (204) may be given a data feed URL of:

http://www.ibm.com/rss/latestnews

If the data feed has been viewed by the user via data feed reader (203), the data feed client (204) is arranged to append a "viewed" flag, resulting in the following modified polling of the corresponding data feed URL:

http://www.ibm.com/rss/latestnews?<viewed>

In response to each data feed poll, the data feed server (201) is arranged to inspect the requested URL for a "viewed" flag. If no such flag is present, the data feed request is handled as normal. If, however, a "viewed" flag has been appended, then a record of the data feed URL along with a time stamp is entered in the data feed usage statistics (202). The data feed request is then handled as normal.

Figure 3A:
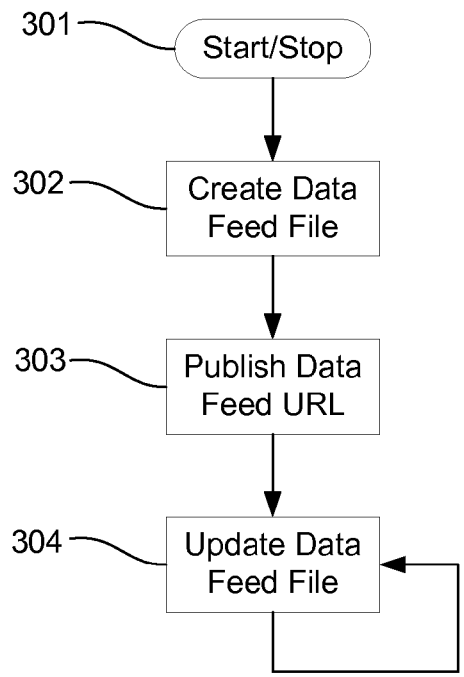
FIG. 3A is a flow chart illustrating processing performed by the data feed server of FIG. 2 according to an embodiment of the present exemplary system and method.

The processing performed by the data feed server (201) when publishing a data feed will now be described in further detail with reference to the flow chart of FIG. 3A. At step 301, the data feed server (201) is started up and processing moves to step 302 where the data feed publisher creates an RSS XML file for the data feed content. Processing then moves to step 303 where the data feed URL is published on a web site to enable users to identify and select the feed. Processing then moves to step 304 where any updates to the data feed are made to the RSS XML file so as to provide updated data to any subscribed users. The processing of step 304 repeats for as long as the data feed remains in a published state so as to enable repeated updates of the data feed data.

Figure 3B:
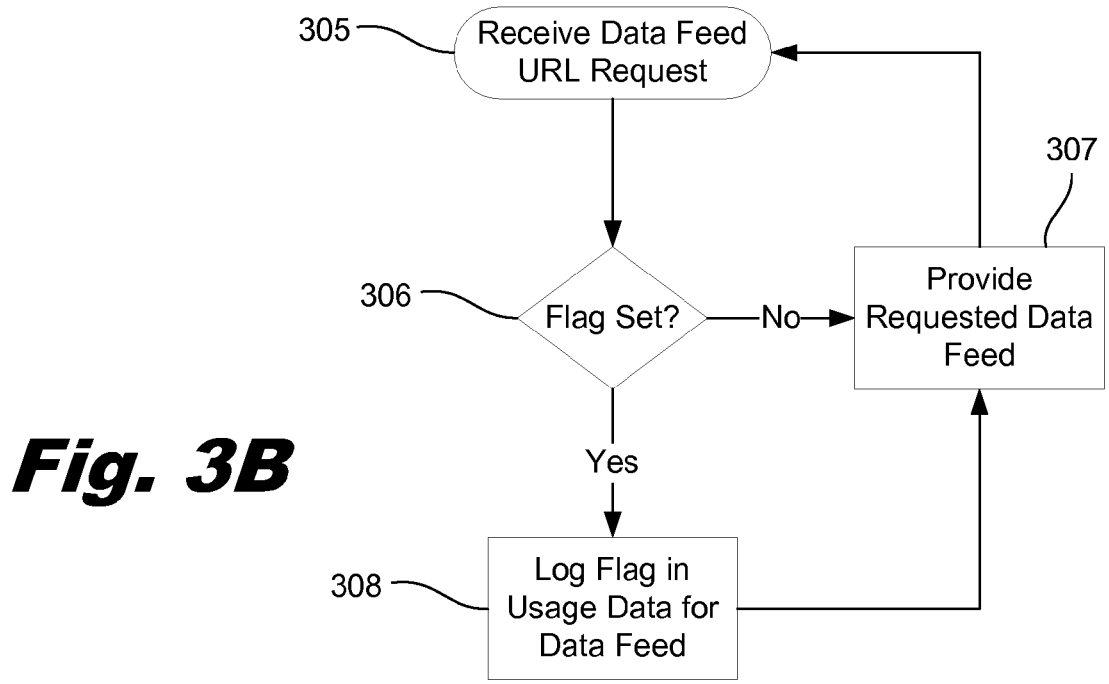
FIG. 3B is a flow chart illustrating processing performed by the data feed server of FIG. 2 according to another embodiment of the present exemplary system and method.

The processing performed by the data feed server (201) in response to data feed polls will now be described in further detail with reference to the flow chart of FIG. 3B. At step 305, processing is initiated in response to a data feed poll in the form of an HTTP request identifying a data feed. Processing then moves to step 306 where the received URL is inspected to determine whether or not a "viewed" flag has been appended. If no "viewed" flag has been appended then processing moves to step 307 where the requested data feed data is provided and processing returns to step 305 to await a further poll. If, at step 306, a "viewed" flag is identified then processing moves to step 308 where the data feed URL and a time stamp are recorded in the data feed usage statistics (202). Processing then moves to step 307 and proceeds as described above.

Figure 4:
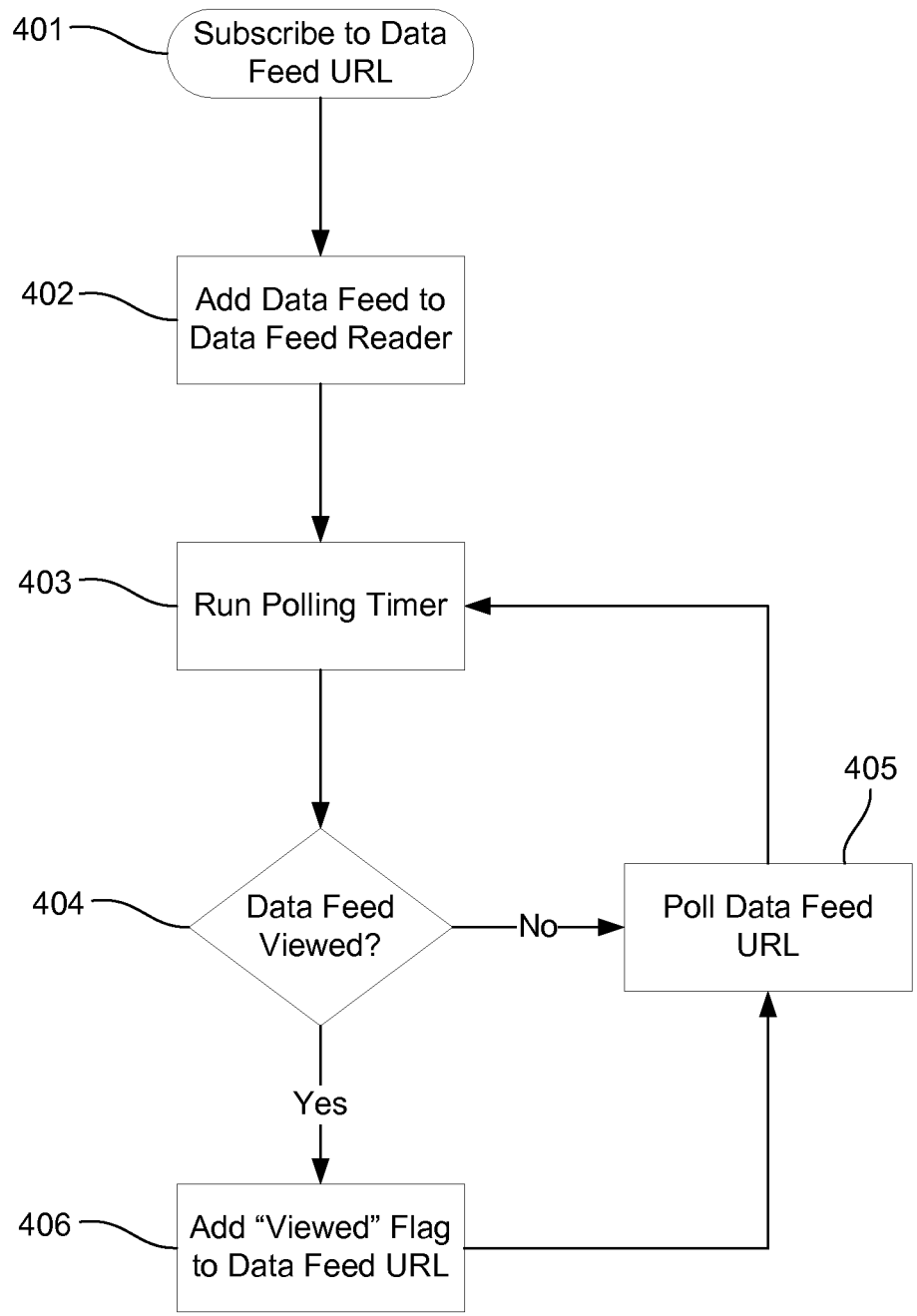
FIG. 4 is a flow chart illustrating processing performed by the data feed client of FIG. 2 according to an embodiment of the present exemplary system and method.

The processing performed by the data feed client (204) when polling a data feed will now be described in further detail with reference to the flow chart of FIG. 4. At step 401, processing is initiated when a user subscribes to a data feed via data feed reader (203). Processing then moves to step 402 where the data feed reader (203) informs the data feed client (204) of the new data feed and processing moves to step 403. At step 403, the data feed client (204) starts a poll timer for a predetermined time interval. When the poll timer time interval expires, processing moves to step 404. At step 404, the data feed client (204) is arranged to interrogate the data feed reader (203) to determine whether the data feed for which a poll is about to be made has been viewed. If the data feed has not been viewed, then processing moves to step 405. At step 405, the data feed URL is polled and the data feed updated accordingly. Processing then returns to step 403 and proceeds as described above. If, at step 404, the data feed reader (203) indicates that the respective data feed has been viewed, then processing moves to step 406 where a "viewed" flag is appended to the data feed URL. Processing then moves to step 405 where the data feed URL is polled using the URL with the appended "viewed" flag. Processing then proceeds as described above where the data feed is updated accordingly and its "viewed" status reset by the data feed reader (203).

In another embodiment, the data feed client is arranged to upload the data for a given data feed only if the data is new or has been updated since the last poll. In a further embodiment, the data feed server is arranged to collect further data from data feed readers, such as the originating URL. The data feed client may be arranged to provide further data feed usage data in addition to a "viewed" flag. In another embodiment, the data feed client is arranged to maintain the "viewed" status for a given data feed for a predetermined period that may exceed the data feed polling period.

In a further embodiment, the data feed client is arranged only to poll a given data feed if the data feed has been viewed by the user within a predetermined period. The predetermined period may correspond to or exceed the polling period. In another embodiment, the data feed server is arranged to record only the most recent "viewed" status for given data feed. In a further embodiment, the data feed reader is arranged to update a data feed client poll table with "viewed" flag to remove the need for the data feed client to interrogate the data feed reader prior to each poll. The data feed client is arranged to reset the table entry for a given data feed on each respective poll. In another embodiment, the usage data is used by the data feed server to remove or deactivate redundant or unused feeds. In still another embodiment, the usage data may be collected by the data feed server to indicate to a data feed provider that the data feeds may need to be amended. Thus, the data feed provider may be made aware that a particular data feed is not being read or viewed for some reason and may need to be updated to increase subscription to the data feed or increase the use of a particular data feed.

As will be understood by those skilled in the art, the data feed reader may be a stand-alone application or form part of another suitable application program such as a web browser or email client application program. Furthermore, part or all of the functions of the data feed client and reader as described above may be provided by one or more application programs.

Further, as will be understood by those skilled in the art, other suitable protocols are available for providing data feeds and may be arranged or adapted to provide the facilities described above. Also, the functions of the client computer described herein may be provided by any suitable device and may connect to the data feed server via any suitable means such as a wireless, mobile, or peer-to-peer (P2P) network.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for tracking usage of a data feed, comprising:
a data feed server configured to respond to a poll from a client computers and transmit a data feed in response to said poll from said client computer;
in which said data feed server is further configured to receive usage data from said client computer that indicates usage of said data feed at said client computer,
in which said usage data is appended to the poll received from said client computer for transmission of the data feed.

2. The system of claim 1, wherein said usage data indicates whether said data feed was accessed by a user on said client computer.

3. The system of claim 1, wherein said usage data comprises a "viewed" flag.

4. The system of claim 1, wherein said data feed server is further configured to log said usage data from multiple client computers to determine overall usage of said data feed.

5. The system of claim 4, wherein said data feed server is configured to generate data feed usage statistics for said data feed.

6. The system of claim 1, wherein said data feed server is configured to timestamp said usage data when received.

7. A client computer for accessing a data feed, comprising:
a client computer configured to communicate with at least one data feed server that publishes a data feed,
wherein the client computer selectively polls the data feed server for the data feed, wherein the client computer is further configured to record usage data indicating usage of the data feed at the client computer and, in a subsequent polling of the data feed sever, report the usage data for the data feed to the data feed server,
wherein the usage data is appended to the subsequent polling for transmission of the data feed.

8. The client computer of claim 7, wherein the usage data indicates whether the data feed has been viewed.

9. The client computer of claim 8, wherein said client computer is configured to check activity of a data feed reader prior to polling said data feed server and submitting said usage data.

10. The client computer of claim 7, wherein said client computer is configured to selectively poll for the data feed with a Universal Resource Locator (URL), wherein the usage data is appended to the query to the URL.

11. The client computer of claim 7, further comprising a data feed reader configured to view the data feed and provide an indication that the data feed has been viewed on the client computer.

12. The client computer of claim 11, wherein the data feed reader is further configured to update a data feed client poll table to indicate usage of a data feed to the data feed client.

13. The client computer of claim 12, wherein the client computer is further configured to reset a number of entries in the data feed client poll table after reporting usage data to the data server.

14. A method of determining usage of a data feed comprising:
collecting usage data with a data server that indicates whether a data feed provided by said data server was accessed by a user at a client computer to which the data server had transmitted said data feed,
and transmitting said usage data to said data server along with a poll from a client computer requesting a new transmission of said data feed,
wherein the usage data is appended to the poll from the client computer for transmission of the data feed.

15. The method of claim 14, further comprising generating data feed usage statistics for said data feed.

16. The method of claim 14, further comprising transmitting said usage data to said data server from a client computer receiving said data feed.

17. The method of claim 16, further comprising querying a data feed reader at said client computer for said usage data prior to transmitting said usage data to said data server.

18. The method of claim 16, further comprising time stamping said usage data when received by said data server.

* * * * *